3,257,336
BITUMEN IMPREGNATED CELLULAR
EXPANSION JOINT SEALERS
Dale F. Levy and Duane W. Gagle, Bartlesville, Okla., assignors to Phillips Petroleum Company, a corporation of Delaware
No Drawing. Filed Mar. 29, 1962, Ser. No. 183,389
6 Claims. (Cl. 260—2.5)

This invention relates to bitumen impregnated cellular expansion joint sealers. In one aspect, the invention relates to a method for the impregnation of expansion joint sealers with bitumen.

It is standard practice in the concrete construction of roads, driveways, floor slabs, sidewalks, and the like to use expansion joints to provide for expansion and contraction due to temperature changes. Many different forms of expansion forms are used, all with varying degrees of success.

The invention has for its primary object the preparation of an expansion joint which will prevent the admission of seepage moisture through crevices tending to open between the filling core and the masonry during contraction of the masonry due to decrease in temperature.

It is an object to provide a method for the preparation of a deformable core capable of maintaining tension across the filling core between the masonry sections.

These and other objects of the invention will appear from the ensuing description.

These objects are broadly accomplished by a novel composition comprising a blend of a thermoplastic material capable of forming a cellular mass, a blowing agent and a bitumen, e.g., asphalt.

In one aspect, these objects are accomplished by an article comprising a solid cellular thermoplastic polymer whose surfaces are impregnated with a bitumen.

In another embodiment, an article comprising a solid cellular polymer of a 1-olefin containing a bitumen intimately dispersed therein is prepared by admixing a normally solid polymer of a 1-olefin capable of being formed into a cellular mass, a blowing agent and a bitumen, e.g., asphalt, elevating the temperature of the resultant admixture above the softening point of said polymer, subjecting said admixture to blowing conditions, expanding said admixture and cooling to form a solid cellular mass.

The expansion joint device of this invention finds utility in a large number of applications, particularly in combination with spaced adjacent slabs formed by pouring concrete, said device being of a width corresponding to the desired space between said slabs. The device may be formed in rectangular, oval, circular or other cross-section and used as expansion joint materials between walls and in Portland cement for building construction. The resultant cellular mass has resilient and elastic properties which allow its use in above and similar applications. If desired, the cellular mass may be additionally impregnated with a suitable grade of asphalt which acts as a bonding material to hold the cellular mass in place and seal the joint against moisture and water penetration.

In general, any normally solid polymer of a thermoplastic material can be used within the scope of the invention. It is well known that thermoplastic polymers, such as polymers of ethylene, may be blown or foamed into solid cellular masses. Such cellular materials have been prepared in a variety of ways and from a variety of starting materials such as polyurethane, polystyrenes, cellulose esters, polyvinyl chloride, polyvinylidene chloride, polyethylene and the like.

In one method of producing a cellular structure, the thermoplastic material is dissolved in solvent thereby producing a viscous solution into which is incorporated a third solid component which decomposes upon the application of heat or chemical treatment to yield a gas. After treating the mass so as to decompose the gas generating solid, hollow spaces are formed throughout the material resulting in a permanent porous or cellular structure. In another method, the thermoplastic material has incorporated therein a soluble inorganic solid of finite size which is subsequently extracted by means of a preferential solvent such as water thereby leaving a porous or cellular mass. In another method, preferred in the method of this invention, the molten thermoplastic material is thoroughly mixed with a gas or liquid which is volatile at normal atmospheric pressure and the mixture is then subjected to elevated temperature or pressure in a closed chamber. The material is then released from the closed chamber through a suitable die opening thereby releasing the pressure and causing the gas to expand resulting in a permanent porous of cellular portion upon cooling.

It has now been found that by the incorporation of a bitumen, e.g., asphalt, in said blend or by the impregnation of the surface of the resultant cellular mass with said bitumen that a cellular mass is produced which is impermeable to water and provides an excellent expansion joint device.

Preferred thermoplastic materials are the polymers of olefins such as those obtained by the process set forth in the patent to Hogan and Banks, No. 2,825,721, issued March 4, 1958. According to that patent, polymers are produced by contacting 1-olefins having a maximum chain length of 8 carbon atoms per molecule and no branching nearer the double bond than the 4-position with a solid catalyst containing, as an essential catalytic ingredient, chromium oxide associated with at least one porous oxide selected from the group consisting of silica, alumina, zirconia, and thoria. Liquid phase or vapor phase operation can be employed. Polyethylene produced by such a process will ordinarily have a molecular weight in the range of 35,000 to 280,000 or higher, and a density in the range 0.940 to 0.990 gm./cc., e.g., approximately 0.960. The tensile strength of the polymer, as produced, will ordinarily be of the order of 4,000 to 5,000 p.s.i. but can be higher or lower.

Density as used herein is determined by compression molding a slab of the polymer, cooling said molding at a temperature reduction rate of 15 to 20° F. per minute to room temperature, cutting a pea-sized specimen therefrom, and placing said specimen in a 50-ml., glass-stoppered graduate. Carbon tetrachloride and methylcyclohexane are added to the graduate from burettes in proportion such that the specimen is suspended in the solution. During the addition of the liquids, the graduate is shaken to secure thorough mixing. When the mixture just suspends the specimen, a portion of the liquid is transferred to a small test tube and placed on the platform of a Westphal balance and the glass bob lowered therein. With the temperature shown by the thermometer in the bob in the range 73 to 78° F., the balance is adjusted until the pointer is at zero. The value shown on the scale is taken as the density in gms./cc.

The tensile strength and the elongation were determined by ASTM method D–638–52T, except the compression molded specimens correspond to ATSM method D–412–49T, type C.

Any conventional blowing agent may be used for foaming of the thermoplastic materials by the method of this invention provided it is not detrimental to the polymer at the elevated conditions of temperature and pressure, and is gaseous or produces a gas at the temperature of solidification of the polymer. Blowing agents which decompose at the elevated conditions of temperature and pressure thereby producing a gaseous expanding medium may also be utilized but are not preferred. Suitable materials include nitrogen, methyl chloride, $CO_2$, Freon 12 ($CCl_2F_2$), Freon 114 ($CClF_2CClF_2$), butane, propane, halogenated alkanes, acetone, chloroform, methyl alcohol, ethyl alcohol, methylene dichloride, and the like. The amount of the blowing agent to be used may vary from as little as 1 percent to as much as 300 percent based on polymer weight but it is generally preferred to use an amount in the range of 1 percent to 75 percent, more preferably 1 percent to 5 percent.

The third component of the novel composition of this invention is a bitumen which bitumens are generally defined as mixtures of hydrocarbon of natural or pyrogenous origin, or combinations of both, frequently accompanied by their non-metallic derivatives which may be gaseous, liquid, semisolid or solid and which are completely soluble in $CS_2$. Thus coal tar and pitch are included. Among the more common native or natural asphalts are Gilsonite, Trinidad Lake Asphalt, Rock asphalts, Bermudez Lake asphalt, Iraq, Boeton and Selentza as well as the asphaltites such as Grahamite, and glance pitch. Asphaltic pyrobitumens which cannot properly be included in the above classification but which are within the scope of the invention are Elaterite, Wurtzilite, Albertite and the like. Also included within the scope of the invention are the so-called petroleum asphalts such as vacuum reduced topped crude, solvent extracted topped crude, the catalytic or non-catalytic air-blown asphalts, the asphalt emulsions, the asphalt cements and the rubberized asphalts which frequently contain up to 80 percent natural rubber or synthetic rubber. Preferably, the bitumen is present in an amount in the range of 5–95, more preferably 30 to 60, weight percent based on the total weight of the blend.

In the preferred embodiment of the invention, the thermoplastic material, such as polyethylene, is intimately admixed with the blowing agent and bitumen to provide a uniform dispersion. This may be accomplished in a single mixer, such as an extruder, or the components may be premixed in a mixer, such as a Banbury mill at temperatures below the softening point of the polymer and the gas producing temperature of the blowing agent and then introduced into an extruder or the like. The temperature and pressure of the mixture should be sufficiently high to insure liquidity of the components immediately prior to blowing. In general, the blowing temperature should exceed the softening point of the polymer but should not exceed the decomposition point of the polymer. More preferably a temperature 25 to 250° F. above the melting point will decrease the amount of time necessary to melt the polymer without the corresponding detrimental effects of prolonged heating such as oxidation. Generally, and particularly when employing a high density highly crystalline polyethylene having a melting point of about 260° F., a temperature of 265 to 600° F. will be most satisfactory and more preferably in the range of 350 to 550° F.

The pressure under which the composition should be mixed need be only sufficiently high to produce a satisfactory pressure differential between the mix conditions and the normal atmospheric pressure so that the polymer will be expanded to the desired density upon release of the pressure. For high density highly crystalline polyethylene, this will generally mean a range of 200 to 20,000 p.s.i.a., more preferably 200 to 1200 p.s.i.a.

The mixture may be cooled in the same vessel in which it was mixed, such as a lengthened extruder or a separate unit may be added or a plurality of units may be added so long as the temperature is decreased to a temperature below the softening point of the polymer. The admixture may be expanded by any suitable conventional means such as by discharging the pressurized mass through a nozzle, orifice or slot die into an area of lesser pressure to produce the desired form. Expansion for materials of this type may be very great. For instance, the expansion of high density highly crystalline polyethylene may be from about 60 pounds per cubic foot to a foam of roughly 1 pound per cubic foot. The usual density for a good foam may vary from 0.5 pound per cubic foot to 30 or more pounds per cubic foot depending upon the ultimate use thereof. Foam produced from high density polyethylene has exceptionally high tear strength and exceptionally low temperature toughness.

By preparing the admixture of this invention and producing a cellular mass therefrom conforming to the space between the slabs of poured concrete, it is possible to produce an expansion joint which is impermeable to the entrance of moisture. If desired, it is within the scope of the invention to coat the surfaces of said device adjacent said slabs with asphalt or tar or to pour a hot molten asphalt or tar into the space between said cellular mass and said concrete slabs.

The asphalts of this invention have a penetration (ASTM D5–52) range of 0 to 200, preferably 60 to 120, a ring and ball (ASTM D36–26) range of 95 to 540, preferably 160 to 250.

The employment of coal tar in conjunction with the foamed polyolefin is particularly advantageous in aircraft fueling areas where petroleum distillates may be dissolved in the aircraft fuel.

It is within the scope of the invention to add pigments and/or fillers as well as other additives known to those skilled in the art in the foaming of thermoplastics so long as the additive is not detrimental to the ultimate utilization of the article.

In a specific embodiment of the invention an admixture containing 2.5 volume percent of p,p'-oxybis-(benzenesulfonylhydrazide) (Celogen A. Z. manufactured by Naugatuck Chemical Company) are admixed in a Banbury mixer at a temperature of 240° F. The admixture is then introduced into the feed hopper of an extruder wherein the temperature is raised to about 400° F. resulting in the formation of an inert gas to form a cellular mass upon the extrusion of the mass through an orifice at the discharge end of the extruder. The pressure within the extruder is 800 p.s.i. and the pressure upon the mass upon discharge is atmospheric. The orifice is shaped to conform to the space required between two concrete slabs in a highway pavement. Upon cooling, the cellular mass is ultimately employed as an expansion joint between two concrete slabs with hot molten tar being used to coat the cellular mass prior to insertion into the joints.

While certain examples, structures and composition and process steps have been described for purposes of illustration, the invention is not limited to these. Variation and modification within the scope of the disclosure and the claims can readily be effected by those skilled in the art.

We claim:
1. A blend of a polymer of a mono-1-olefin, 1 to 300 parts by weight of a blowing agent based on polymer and 5 to 95 parts by weight based on polymer of an asphalt.
2. An article comprising a solid cellular polymer of a mono-1-olefin containing 5 to 95 parts by weight based on polymer of asphalt intimately dispersed therein.
3. An article comprising a solid cellular polymer of a mono-1-olefin containing asphalt intimately dispersed therein, said article being prepared by admixing a normally solid polymer of a mono-1-olefin capable of being formed into a cellular mass, 1 to 300 parts by weight based on polymer of a blowing agent and 5 to 95 parts by weight based on polymer of an asphalt, elevating the temperature of the resultant admixture above the softening point of said polymer at elevated pressures, releasing said pressure and expanding said admixture and cooling to form a solid cellular mass.

4. The article of claim 3 wherein said polymer comprises a polymer of ethylene.

5. The blend of claim 1 wherein said polymer comprises a polymer of ethylene.

6. The article of claim 2 wherein said polymer comprises a polymer of ethylene.

References Cited by the Examiner

UNITED STATES PATENTS

| | | | |
|---|---|---|---|
| 2,431,385 | 11/1947 | Fischer | 94—18 |
| 2,610,956 | 9/1952 | Derkson et al. | 260—28.5 |
| 2,642,366 | 6/1953 | Rumberger | 117—138.8 |
| 2,871,212 | 1/1959 | Thayer | 260—28.5 |
| 2,882,184 | 4/1959 | Trachet | 117—138.8 |
| 2,888,407 | 5/1959 | Cooper et al. | 260—2.5 |
| 2,928,130 | 3/1960 | Gray | 260—2.5 |
| 2,945,827 | 7/1960 | Henning | 117—138.8 |
| 2,964,424 | 12/1960 | Mast | 94—18.2 |
| 2,967,467 | 1/1961 | Maude | 94—18.2 |
| 2,981,361 | 4/1961 | Schofield | 260—2.5 |
| 3,050,483 | 8/1962 | Kalil | 260—28.5 |
| 3,067,147 | 12/1962 | Rubens et al. | 260—2.5 |

MURRAY TILLMAN, *Primary Examiner.*

LEON J. BERCOVITZ, *Examiner.*

M. FOELAK, *Assistant Examiner.*